United States Patent
Koike et al.

(10) Patent No.: US 7,144,560 B2
(45) Date of Patent: Dec. 5, 2006

(54) FRAME STRUCTURE FOR HIGH-TEMPERATURE DENITRATION APPARATUS

(75) Inventors: Hitoshi Koike, Funabashi (JP); Masahiro Takeuchi, Funabashi (JP)

(73) Assignee: Ishikawajima-Harima Heavy Industries Co., Ltd., Tokyo (JP)

( * ) Notice: Subject to any disclaimer, the term of this patent is extended or adjusted under 35 U.S.C. 154(b) by 448 days.

(21) Appl. No.: 10/431,426

(22) Filed: May 8, 2003

(65) Prior Publication Data

US 2003/0235524 A1    Dec. 25, 2003

(30) Foreign Application Priority Data

May 10, 2002   (JP)   .............................. 2002-135924

(51) Int. Cl.
*B01J 8/44*   (2006.01)
*B01D 50/00*   (2006.01)

(52) U.S. Cl. ........................................ 422/311; 422/168

(58) Field of Classification Search ................ 422/168, 422/311
See application file for complete search history.

(56) References Cited

U.S. PATENT DOCUMENTS 5,409,670 A * 4/1995 Jaynes et al. ................ 422/177

FOREIGN PATENT DOCUMENTS

JP            10080623 A  *  3/1998

OTHER PUBLICATIONS

U.S. Appl. No. 10/431,426, filed May 8, 2003, Koike et al.
U.S. Appl. No. 10/444,956, filed May 27, 2003, Koike et al.
U.S. Appl. No. 10/444,958, filed May 27, 2003, Koike et al.

* cited by examiner

*Primary Examiner*—Glenn Caldarola
*Assistant Examiner*—Tom P. Duong
(74) *Attorney, Agent, or Firm*—Oblon, Spivak, McClelland, Maier & Neustadt, P.C.

(57) ABSTRACT

Each of vertical frame members which constitute a frame body of a high-temperature denitration apparatus and which are erected in a spaced-apart relationship in a direction of exhaust gas flow is provided by a pillar member. The pillar member is an integral combination of a web with upstream and downstream flanges so as to improve thermal conductivity of the same. The web of the pillar member is formed with openings for suppression of thermal capacity to a minimum so as to reduce in weight the web and enhance a temperature rising velocity of the web.

10 Claims, 7 Drawing Sheets

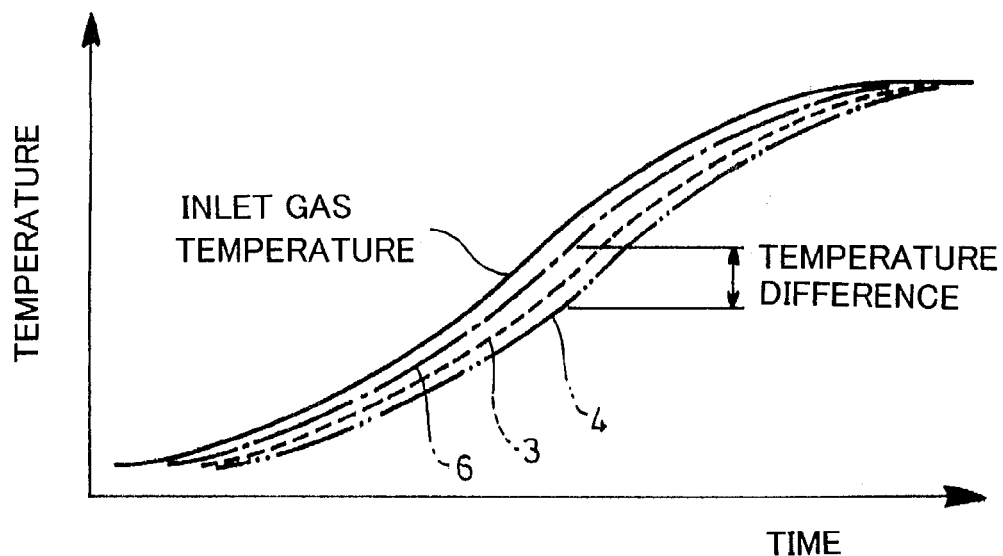
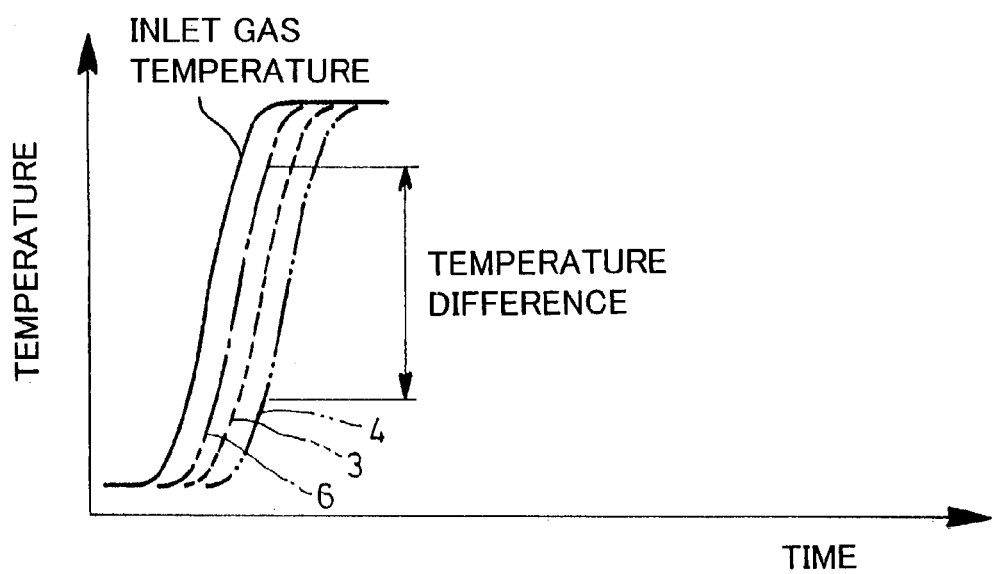

EXHAUST GAS ⇨

EXHAUST GAS ⇨

FRAME STRUCTURE FOR HIGH-TEMPERATURE DENITRATION APPARATUS

BACKGROUND OF THE INVENTION

1. Field of the Invention

The present invention relates to a frame structure for a high-temperature denitration apparatus.

2. Description of the Related Art

A conventional denitration apparatus for boiler exhaust gas generally includes, as shown in FIGS. 1 and 2, a box-shaped casing 1 with front and rear open ends for passage of exhaust gas from a boiler (not shown) and a frame body 2 in the casing 1.

The frame body 2 includes a plurality of vertical frame members 3 erected in a spaced-apart relationship widthwise and in a direction of exhaust gas flow of the casing 1, and a plurality of horizontal frame members 4 fixed to the vertical frame members 3 through welding into a latticework. Thus, spaces 5 to be filled with catalysts are formed in a plurality of widthwise rows and in a plurality of vertical stages within the casing 1. Brace members 6 are welded to interconnect slatwise the frame members 3 and 4 for reinforcement against horizontal forces generated, for example, in an earthquake. A plurality of (two in the example shown in FIG. 2) such frame bodies 2 with the same construction are arranged and interconnected in the direction of exhaust gas flow.

The casing 1 is internally lined with thermal insulation material 7, and upon operation, temperature difference is caused between the casing 1 and the frame body 2 so that a degree in thermal expansion of the latter is greater than that of the former. Such difference in thermal expansion between the casing 1 and the frame body 2 upon operation may be absorbed such that the frame body 2 is supported in the casing 1 partly by fixed supports 8 and partly by slide supports 9 so as to make the frame body 2 slidable widthwise and in the direction of exhaust gas flow of the casing 1.

A catalyst port 11 with an openable lid 10 protrudes from a top of the casing 1. With the lid 10 being opened, catalyst units 12 each filled with catalysts are suspended by, for example, cranes as shown in FIG. 2 and are charged into the spaces 5 in the frame bodies 2.

In the above-mentioned denitration apparatus for boiler exhaust gas, the frame members 3 and 4 as components in the frame body 2 are typically made of H-section steel while the brace members 6 are typically round pipes. Superficial dimensions and weights of these members are not the same; typically, the brace members 6 are most lightweight, the horizontal frame members 4 are less lightweight, and the vertical frame members 3 are least lightweight. As a result, as inlet gas temperature rises during activation, the brace members 6, the horizontal frame members 4 and the vertical frame members 3 are increased in temperature in the order named as is clearly shown in FIG. 3. However, since the rising velocity of the inlet gas temperature during activation is not so swift and an activation period is as long as about 2 hours, temperature differences between the members 3, 4 and 6 are not so great and there is no fear of thermal stresses being generated locally between the members during activation, though the members are completely welded together.

Recently, a gas turbine is frequently used for generation of electricity and, in such a case, exhaust gas from the gas turbine must be denitrated. To this end, it has been envisaged that, as a high-temperature denitration apparatus for gas-turbine exhaust gas, the above-mentioned denitration apparatus for boiler exhaust gas is utilized, with no structural change and with material of which the members 3, 4 and 6 are made being changed from carbon steel to stainless steel.

However, in the case of a high-temperature denitration apparatus for gas-turbine exhaust gas, a rising velocity of inlet gas temperature during activation is extremely swift as compared with that in the conventional denitration apparatus for boiler exhaust gas, and the activation period is as short as about 15 minutes; as a result, as the inlet gas temperature rises, great temperature differences are caused between the members 6, 3 and 4 due to differences in superficial dimension and weight between the members as shown in FIG. 4, resulting in a possibility of thermal stresses being generated locally between the members during activation.

During activation of the high-temperature denitration apparatus for gas-turbine exhaust gas, thermal conductivity in the direction of exhaust gas flow between the upstream and downstream vertical frame members 3 is low since it is effected only through the horizontal frame members 4 and the brace member 6 as shown in FIG. 5. As a result, an extremely great temperature difference $\Delta T$ (up to about 200° C.) is caused between temperature $T_{in}$ on a front surface of the upstream vertical frame member 3 and temperature $T_{out}$ on a rear surface of the downstream vertical frame member 3 so that a great difference in thermal expansion is caused between the upstream and downstream vertical frame members 3, resulting in curved deformation of the frame body 2 backward as shown in FIG. 6, thereby leading to a possibility of excessive thermal stresses being generated. To the contrary, during inactivation, the frame body 2 may be deformed forward, also resulting in a possibility of excessive thermal stresses being generated.

With respect to each of the individual members such as the most upstream frame members 3 and 4, during activation of the high-temperature denitration apparatus for gas-turbine exhaust gas, a great temperature difference $\Delta t$ is caused between temperatures $t_{in}$ and $t_{out}$ of front and rear surfaces of the frame member 3 or 4 as shown in FIG. 7, resulting in a great difference in thermal expansion between the front and rear surfaces of the frame member 3 or 4, thereby leading to a possibility of great thermal stresses being generated also with respect to each of the individual members.

The invention was made in view of the above and has its object to provide a frame structure for a high-temperature denitration apparatus which can suppress differences in thermal expansion or contraction between the members of the frame body due to temperature differences between them during activation or inactivation, thereby defusing generation of thermal stresses.

BRIEF SUMMARY OF THE INVENTION

In a first aspect of the invention, the invention is directed to a frame structure for a high-temperature denitration apparatus which comprises a box-shaped casing with front and rear open ends for passage of hot exhaust gas and a frame body within the casing. The frame body comprises a plurality of vertical frame members erected in a spaced-apart relationship widthwise and in a direction of exhaust gas flow of the casing and a plurality of horizontal frame members fixed to the vertical frame members into a latticework, thereby providing spaces to be filled with catalysts in a plurality of widthwise rows and in a plurality of vertical stages within the casing. Each of the vertical frame members in the direction of exhaust gas flow are provided by a pillar member which is an integral combination of a web with upstream and downstream flanges. The web is formed with openings for minimization of thermal capacity.

In a second aspect of the invention, the invention is directed to a frame structure for a high temperature denitration apparatus which comprises a box-shaped casing with front and rear openings for passage of hot exhaust gas and a frame body within the casing. The frame body comprises a plurality of mutually spaced vertical frame members widthwise and in a direction of exhaust gas flow of the casing and a plurality of horizontal frame members fixed to the vertical frame members into a latticework, thereby providing spaces to be filled with catalysts in a plurality of widthwise rows and in a plurality of vertical stages within the casing. Each of furthest upstream members of the frame body in the direction of exhaust gas flow having a front surface to which a heat shield plate is mounted.

In the first aspect of the invention, each of the vertical frame members in the direction of exhaust gas flow is provided by the pillar member which is the integral combination of the web with the upstream and downstream flanges so that thermal conductivity is improved. Moreover, the web of the pillar member is formed with openings for minimization of thermal capacity so that the weight of the web is decreased to enhance a temperature rising velocity of the same. As a result, during activation of the high-temperature denitration apparatus, only an extremely small difference in temperature is caused between front and rear surface of the upstream and downstream flanges of the pillar member so that a difference in thermal expansion between the upstream and downstream flanges of the pillar member is reduced; thus, the curved deformation of the frame body backward is substantially alleviated and excessive thermal stresses are prevented from being generated. Also during inactivation, the curved deformation of the frame body forward is substantially alleviated and excessive thermal stresses are prevented from being generated.

In the second aspect of the invention, the heat shield plates, which are mounted on the front surfaces of the upstream members of the frame body in the direction of exhaust gas flow, prevent the hot exhaust gas from directly contacting the front surfaces of the members. As a result, during activation of the high-temperature denitration apparatus, no substantial difference in temperature is caused between the front and rear surfaces of each of the members in the frame body so that a difference in thermal expansion between them is negligible and no substantial thermal stresses are generated.

Preferred embodiments of the invention will be described in conjunction with the drawings.

BRIEF DESCRIPTION OF THE DRAWINGS

FIG. 3 is a diagram showing rising curves of inlet gas temperature and temperatures of respective members during activation of a denitration apparatus for boiler exhaust gas;

FIG. 4 is a diagram showing rising curves of inlet gas temperature and temperatures of respective members during activation of a high-temperature denitration apparatus for gas-turbine exhaust gas;

DETAILED DESCRIPTION OF THE PREFERRED EMBODIMENT

Figure 1:
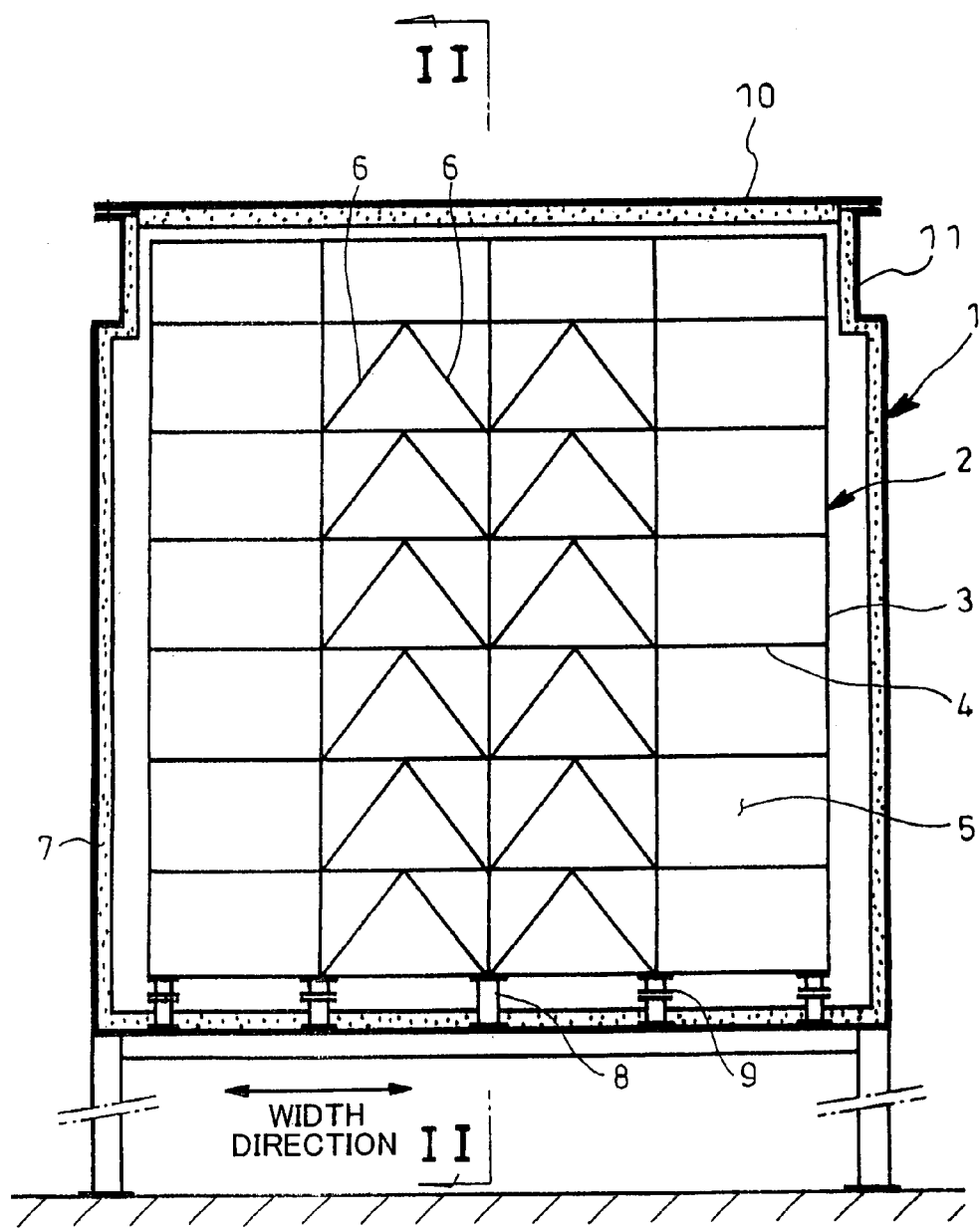
FIG. 1 is a front view of a conventional denitration apparatus.
Figure 2:
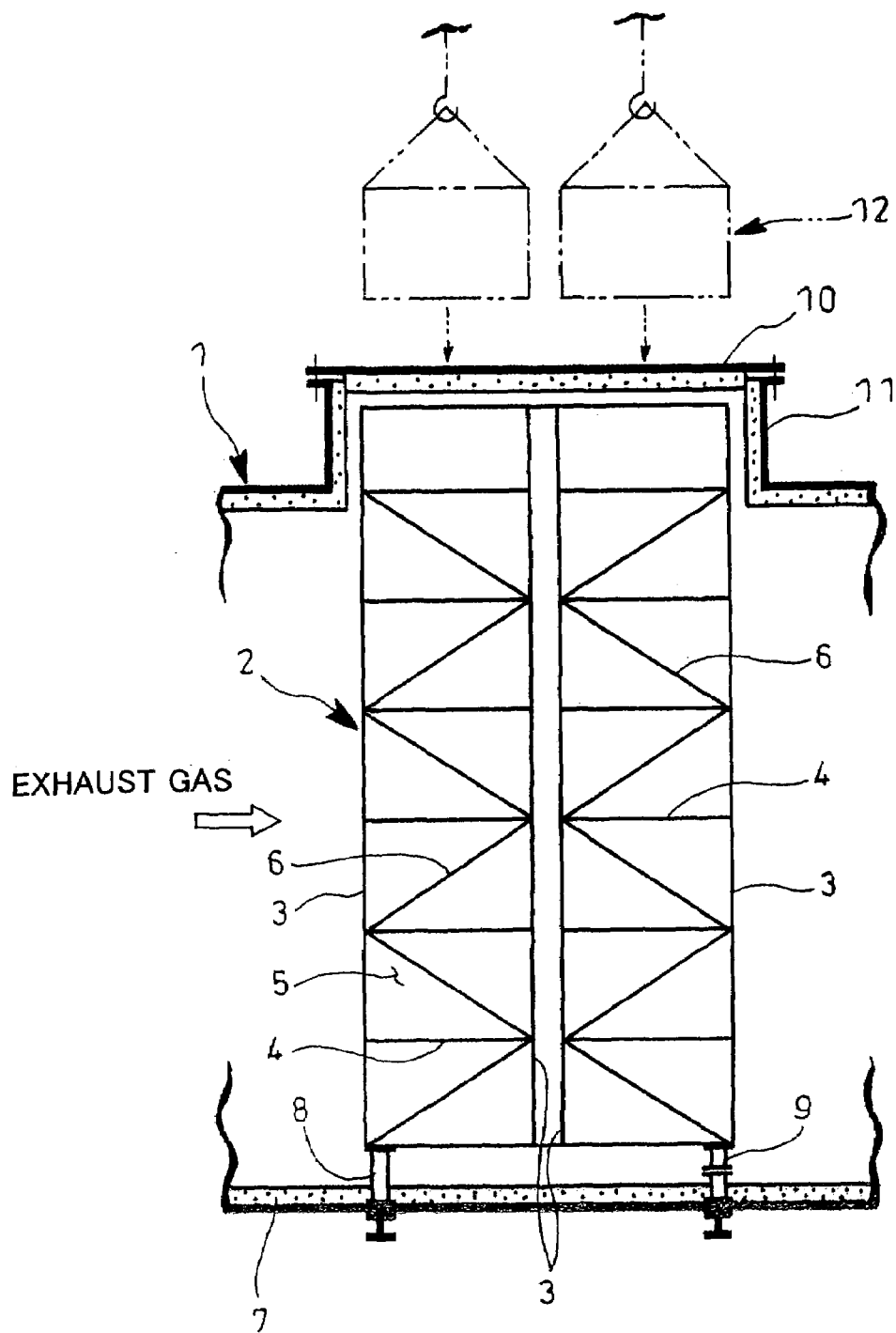
FIG. 2 is a view looking in the direction of arrows II in FIG. 1.
Figure 5:
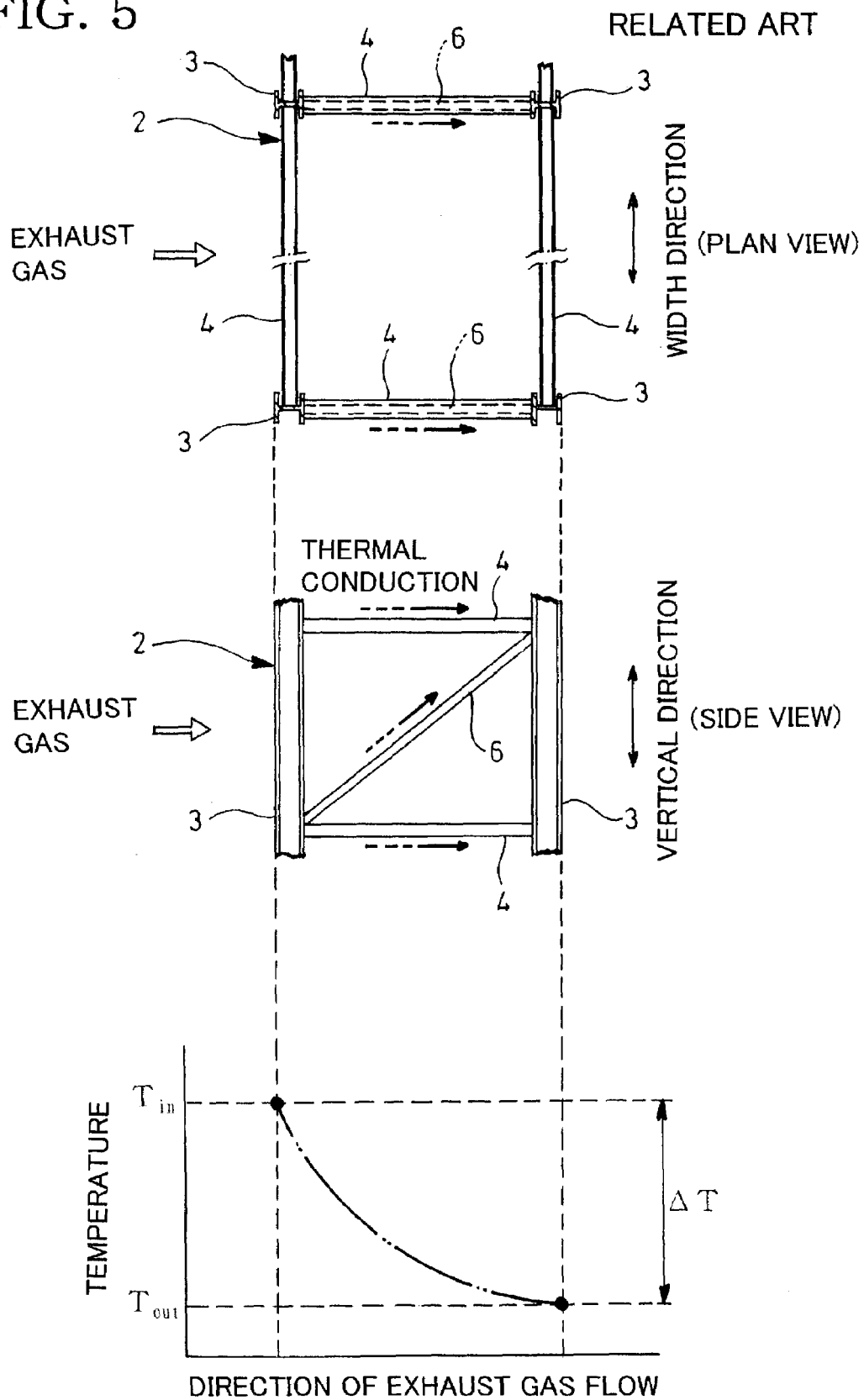
FIG. 5 is a diagram for explanation of difference in temperature between upstream and downstream vertical frame members in the direction of exhaust gas flow during activation of the high-temperature denitration apparatus for gas-turbine exhaust gas.
Figure 6:
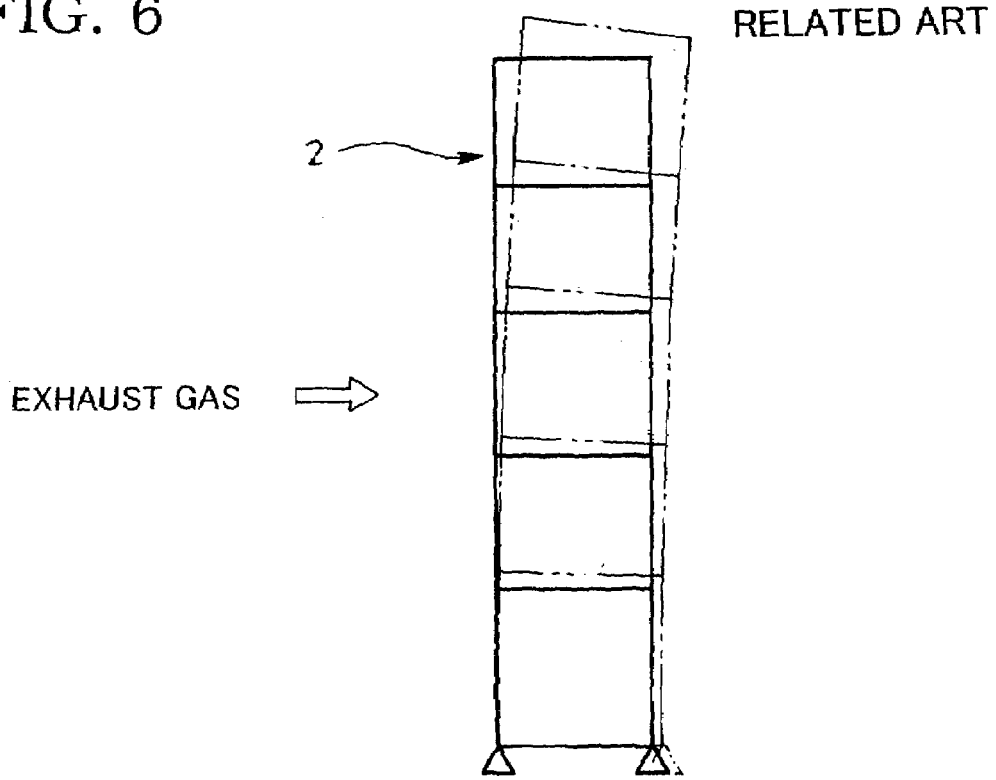
FIG. 6 is a schematic side view for explanation of curved deformation of the frame body during activation of the high-temperature denitration apparatus for gas-turbine exhaust gas.
Figure 7:
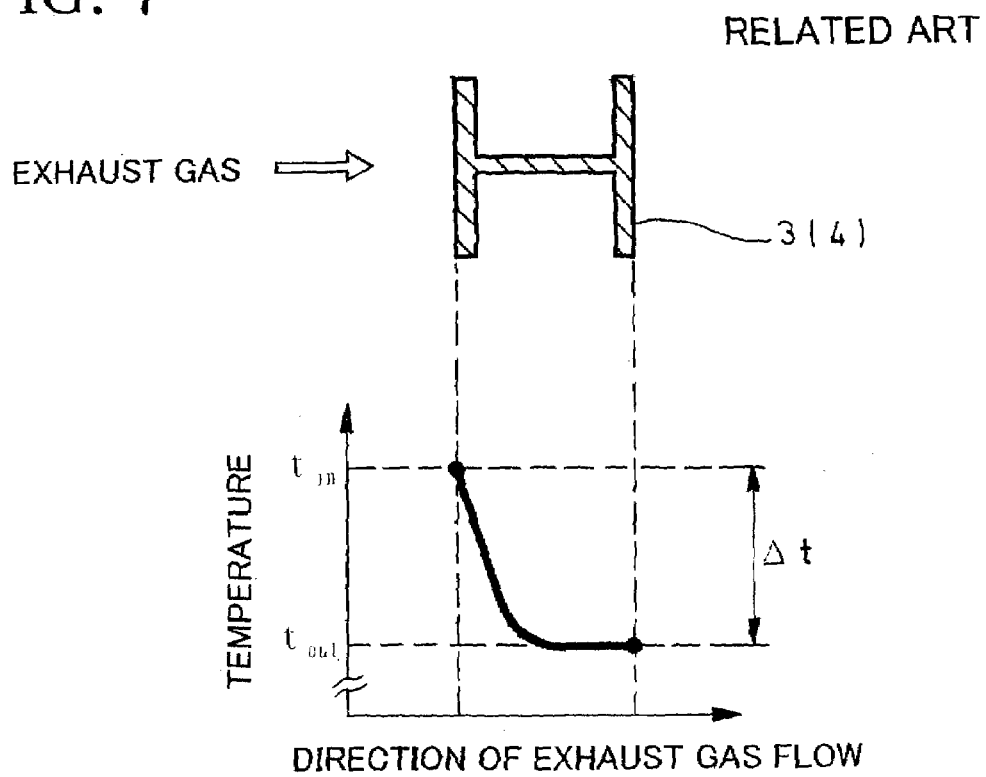
FIG. 7 is a diagram for explanation of a difference in temperature between front and rear surfaces of the furthest upstream vertical or horizontal frame member in the frame body in the direction of exhaust gas flow during activation of the high-temperature denitration apparatus for gas-turbine exhaust gas.
Figure 8:
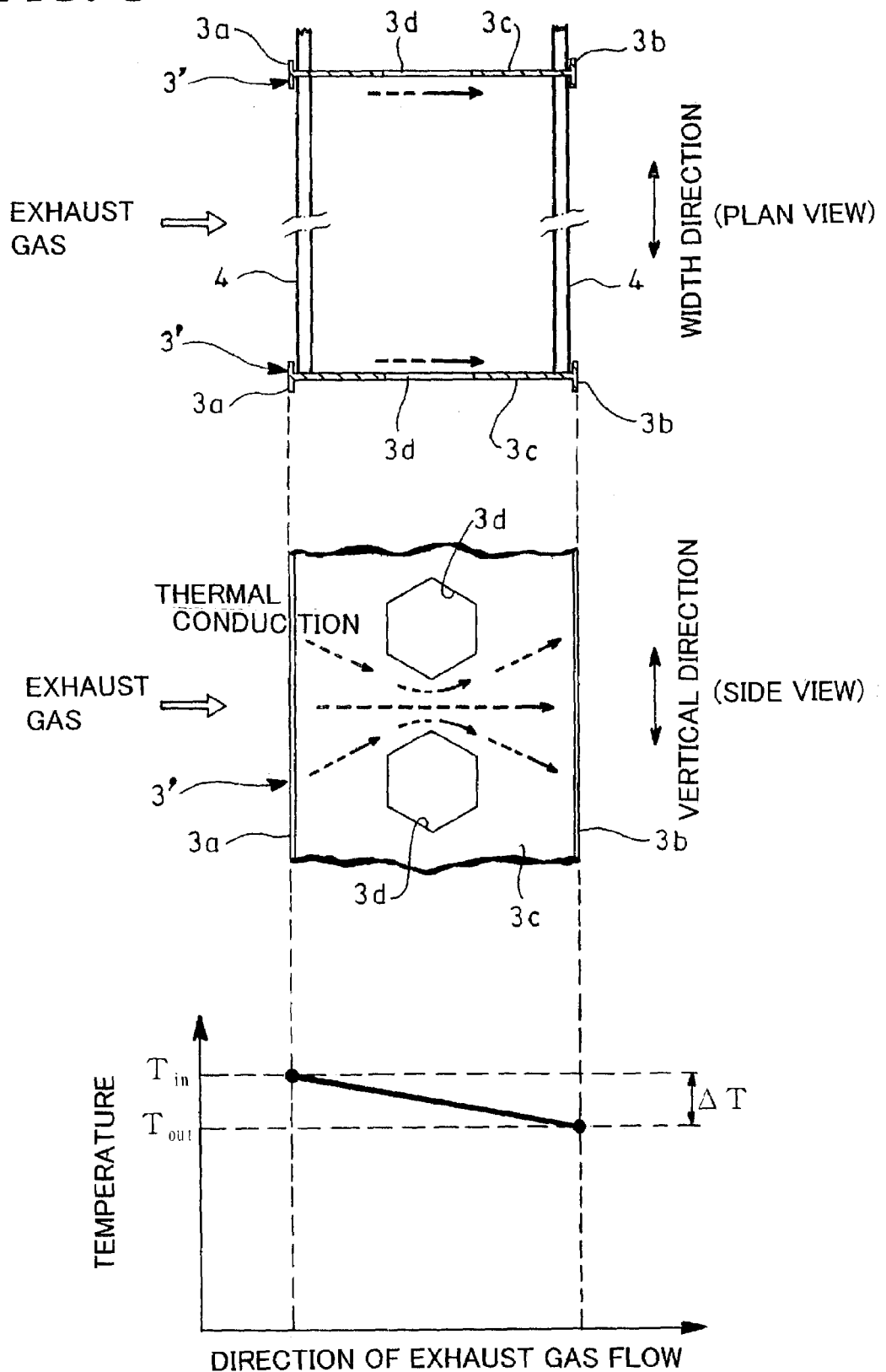
FIG. 8 is a schematic view showing an embodiment of the invention.

FIG. 8 shows an embodiment of the invention in which parts similar to those shown in FIGS. 1 to 6 are represented by the same reference numerals. This embodiment resides in that, as shown in FIG. 8, each of the mutually spaced vertical frame members, which are erected in the direction of exhaust gas flow, is provided by a pillar member 3'. The pillar member 3' is an integral combination of a web 3c with an upstream flange 3a and a downstream flange 3b. The web 3c is formed with openings 3d for minimization of thermal capacity.

In the embodiment shown, each of the openings 3d on the web 3c of the pillar member 3' is in the shape of a hexagon, which is easy to be worked; alternatively, it may be in the form of any other polygon, circular or oval.

Next, the mode of operation of the above-mentioned embodiment will be disclosed.

As mentioned above, each of the mutually spaced vertical frame members, which are erected in the direction of exhaust gas flow, is provided by a pillar member 3'. The pillar member 3' is an integral combination of a web 3c with an upstream flange 3a and a downstream flange 3b so that thermal conductivity is improved. Moreover, the web 3c of the pillar member 3' is formed with openings 3d for suppression of thermal capacity to a minimum so that the weight of the web 3c is reduced to increase a temperature rising velocity of the same. As a result, during activation of the high-temperature denitration apparatus for gas-turbine exhaust gas, only an extremely little temperature difference ΔT (about 30–40° C.) is caused between temperature $T_{in}$ on a front surface of the upstream flange 3a of the pillar member 3' and temperature $T_{out}$ on a rear surface of the downstream flange 3b as shown in FIG. 8, resulting in little difference in thermal expansion between the upstream flange 3a and the downstream flange 3b of the pillar member 3'. As a result, any curved deformation of the frame body 2 backward is greatly alleviated and excessive thermal stresses are prevented from being generated. Also during inactivation, any curved deformation of the frame body 2 forward is greatly alleviated and excessive thermal stresses are prevented form being generated.

Thus, during activation or inactivation, differences in thermal expansion or contraction between members of the frame body 2 due to differences in temperature between them may be suppressed to a minimum and generation of thermal stresses is defused.

Figure 9:
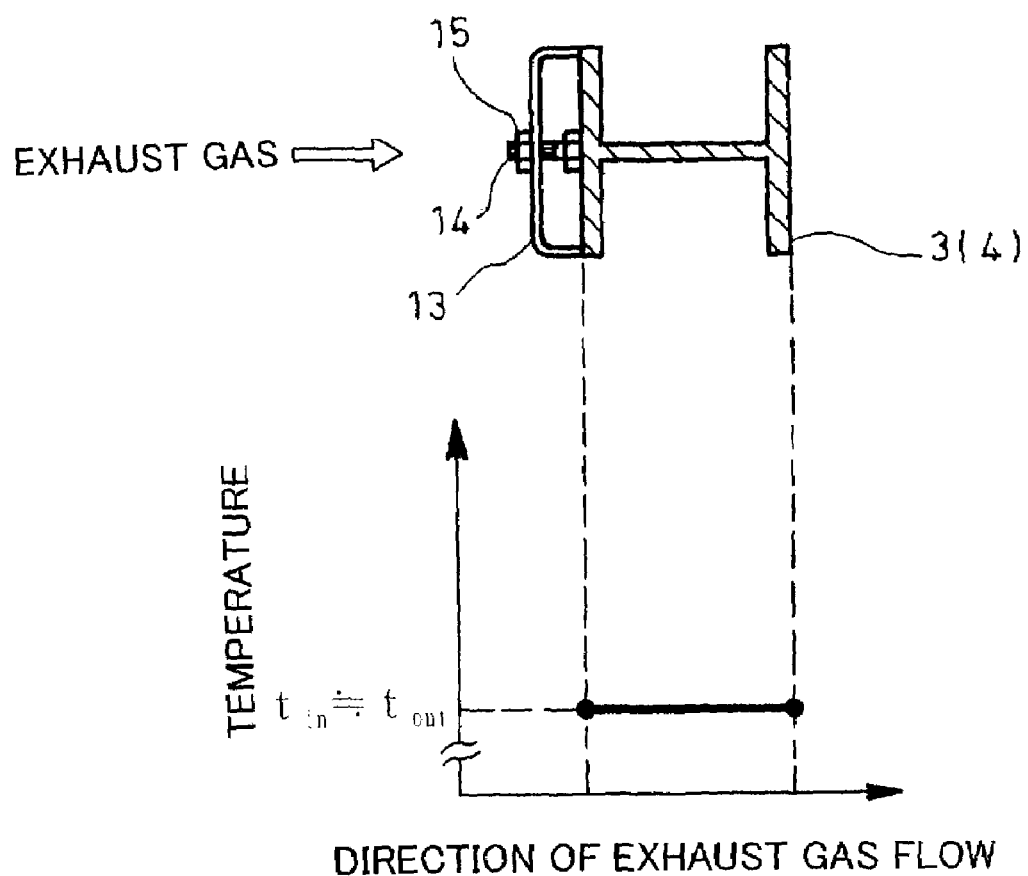
FIG. 9 is a schematic view showing a further embodiment of the invention.

FIG. 9 shows a further embodiment of the invention in which parts similar to those shown in FIGS. 1 to 6 are represented by the same reference numerals. The further embodiment resides in that a heat shield plate 13 is mounted on each of front surfaces of the furthest upstream vertical and horizontal frame members, 3 and 4 respectively, of the frame body 2 in the direction of exhaust gas flow.

In the further embodiment shown, a bolt 14 welded to the front surface of each of the frame members 3 and 4 extends through a through hole (not shown) of the heat shield plate 13 so that the plate 13 can be firmly fixed by tightly screwing a nut 15 onto the bolt 14.

Mounting of the heat shield plates 13 as mentioned above to the front surfaces of the most upstream vertical and horizontal frame members, 3 and 4 respectively, of the frame body 2 in the direction of exhaust gas flow prevents the hot exhaust gas from directly contacting the front surfaces of the frame members 3 and 4. As a result, during activation of the high-temperature denitration apparatus for gas-turbine exhaust gas, temperature $t_{in}$ on the front surface of the frame member 3 or 4 is substantially equal to temperature $t_{out}$ on the rear surface of the same so that temperature difference $\Delta t$ between them is substantially zero as shown in FIG. 9. Difference in thermal expansion between the front and rear surfaces of the frame member 3 or 4 is therefore negligible and no substantial thermal stresses are generated also with respect to each of the individual members.

It is to be understood that the present invention is not limited to the above-mentioned embodiments and that various changes and modifications may be made without deferring from the scope and spirit of the invention. For example, the heat shield plate 13 as shown in FIG. 9 may be mounted on the front surface of the upstream flange 3a of the pillar member 3' shown in FIG. 8 so as to obtain synergistic effects of both the embodiments.

As is clear from the above, according to a frame structure for a high-temperature denitration apparatus of the invention, during activation or inactivation, differences in thermal expansion or contraction between members of a frame body due to differences in temperature between them may be suppressed to minimum, thereby defusing generation of thermal stresses.

What is claimed is:

1. A frame structure for a high-temperature denitration apparatus, said frame structure comprising:
    a box-shaped casing with front and rear open ends for passage of hot exhaust gas and a frame body within said casing,
    said frame body comprising a plurality of vertical frame members erected in a spaced-apart relationship widthwise and in a direction of exhaust gas flow of said casing, and a plurality of horizontal frame members fixed to said vertical frame members into a latticework, thereby providing spaces to be filled with catalysts in a plurality of widthwise rows and in a plurality of vertical stages within the casing,
    each of said vertical frame members in the direction of exhaust gas flow being provided by a pillar member which is an integral combination of a web with upstream and downstream flanges, said web being formed with openings for minimization of thermal capacity.

2. The frame structure according to claim 1, wherein the openings have a polygon shape.

3. The frame structure according to claim 1, wherein the openings have a hexagonal shape.

4. The frame structure according to claim 1, wherein the openings have a circular shape.

5. The frame structure according to claim 1, wherein the openings have an oval shape.

6. A frame structure for a high-temperature denitration apparatus, said frame structure comprising:
    a box-shaped casing with front and rear open ends for passage of hot exhaust gas and a frame body within said casing,
    said frame body comprising a plurality of vertical frame members erected in a spaced-apart relationship widthwise and in a direction of exhaust gas flow of said casing, and a plurality of horizontal frame members fixed to said vertical frame members into a latticework, thereby providing spaces to be filled with catalysts in a plurality of widthwise rows and in a plurality of vertical stages within the casing,
    said vertical frame members in the direction of exhaust gas flow being provided by a pillar member which is an integral combination of a web with upstream and downstream flanges, said web being formed with an opening for minimization of thermal capacity.

7. The frame structure according to claim 6, wherein the opening has a polygon shape.

8. The frame structure according to claim 6, wherein the opening has a hexagonal shape.

9. The frame structure according to claim 6, wherein the opening has a circular shape.

10. The frame structure according to claim 6, wherein the opening has an oval shape.

* * * * *